UNITED STATES PATENT OFFICE.

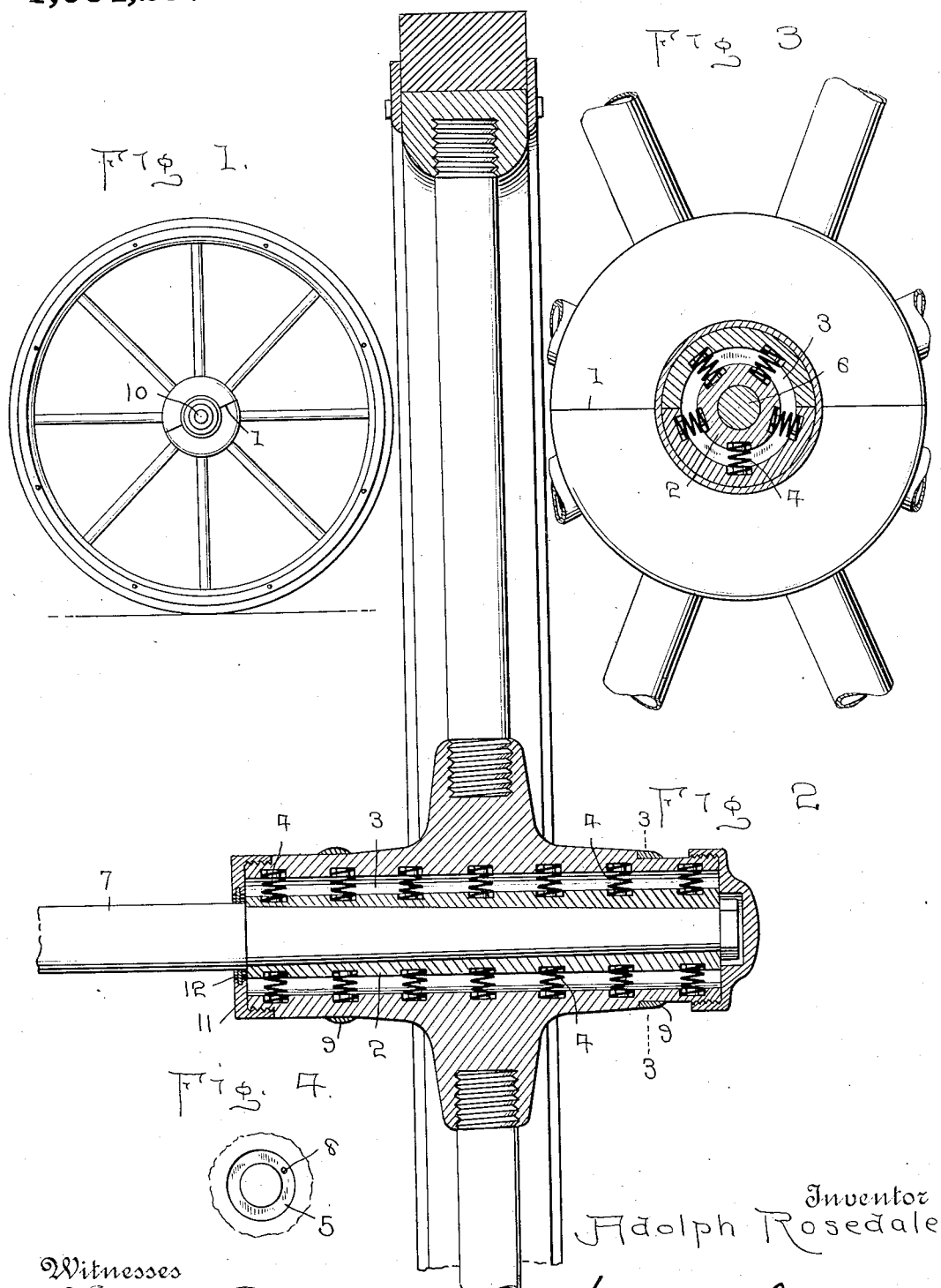

ADOLPH ROSEDALE, OF ALEXANDRIA, LOUISIANA, ASSIGNOR OF TWENTY-FIVE ONE-HUNDREDTHS TO JOHN N. P. CRAMER, OF HARRINGTON TOWNSHIP, BERGEN COUNTY, NEW JERSEY, AND ONE-HALF TO JOSEPH M. GOLDBERG, OF ALEXANDRIA, LOUISIANA.

RESILIENT WHEEL.

1,064,257.

Specification of Letters Patent. Patented June 10, 1913.

Application filed July 31, 1912. Serial No. 712,381.

*To all whom it may concern:*

Be it known that I, ADOLPH ROSEDALE, a citizen of the United States, residing at Alexandria, in the parish of Rapides and State of Louisiana, have invented certain new and useful Improvements in Resilient Wheels; and I do hereby declare the following to be a full, clear, and exact description of the invention, such as will enable others skilled in the art to which it appertains to make and use the same.

My invention relates to wheel construction and more particularly to a form of cushion wheel possessing great resiliency and designed to wholly obviate the necessity of using pneumatic tires, and my prime object, among others, is to provide a maximum degree of resiliency and at the same time in no wise decrease in any degree the strength or efficiency of the wheel.

A further special object of my invention is to provide mechanism which will confine the resiliency to the hub proper of the wheel, thereby absorbing all blows or jarring incident to passing over uneven surfaces or objects in the roadway.

Other objects and advantages will be hereinafter made clearly apparent, reference being had to the accompanying drawings forming part of this application and in which, Figure 1 shows a side elevation of my invention completely ready for use. Fig. 2 is a sectional view of a wheel showing my invention as applied to use. Fig. 3 is a sectional view of the hub provided with my resilient structure as taken on dotted line 3—3 of Fig. 2, and Fig. 4 is a detail view showing the special form of socket for receiving one end of one of the plurality of compression springs, through the mediation of which resiliency is secured.

For convenience in referring to the various elements of my invention and coöperating accessories, numerals will be employed, similar numerals designating corresponding parts throughout the several views.

I desire to call particular attention to the fact that I have confined the resiliency of my wheel to the hub proper and it will be observed by reference to Figs. 1 and 3 that I have provided a two-part hub, the line of separation being indicated by the numeral 1, and the hub thus formed is provided with a suitable bore of such diameter as to receive the boxing 2 and provide the annular space 3 surrounding said boxing. The said annular space is designed to afford a seating for the reception of a plurality of compression springs 4, it being understood that the outer end of each spring is disposed in a suitable recess 5, a detail of which is shown in Fig. 4, formed in the inner surface of the bore of the hub, while the inner end of each spring is seated in a corresponding recess formed in a contiguous part of the outer surface of the boxing 2 and it will therefore be observed that by a proper graduation and mounting of the plurality of springs, the said boxing will be held at all times reliably in position, thereby insuring that resiliency of the springs will be utilized to the fullest extent consistent to the use of the vehicle. By reference to Figs. 2 and 3 it will be observed that the spindle proper 6 of the axle 7 is designed to fit snugly within the said boxing and it is obvious that the bore of the boxing may be formed to properly accommodate the tapered outline of the spindle, or a straight bore may be provided if the spindle should be of that character. In Fig. 2 I have shown a tapered bore in the boxing and a tapered spindle, as is common. The hub being formed in two parts permits the ready assembling of the plurality of springs, which are preferably arranged in rows or in alinement with each other, as shown in Figs. 2 and 3, thereby insuring that each spring will carry its proper load at all times and by reason of the fact that each end of each spring is seated in a suitable recess it will be impossible for any spring to casually slip out of place. Moreover, in each recess 5, I prefer to form a suitable aperture 8, designed to receive the extreme end of its respective spring, whereby the spring will be held against casual rotation.

In order that the members of my two-part hub may be efficiently secured together after the plurality of spring members have been properly mounted in their respective places, it is obvious that any suitable compression means may be employed to force the hub members into close contact with each other, when a pair of retaining bands 9, one for each end of the hub, may be provided, thereby permanently locking the hub members together, when the ornamental cap section 10 may be turned home upon a suitable threaded seat and thus insure that dust will be excluded from the bearings and the casual escape of lubricant prevented. In like manner the inner end of the hub may be provided with a cap member 11, which, when turned home, will in connection with the ring member 12 or packing of felt, leather, or the like, reliably exclude the dust, grit, etc. from entering the bearing seat. The position of the ring or packing member 12 also insures that a proper degree of play of the springs will be possible without bringing the inner edge of the cap 11 into contact with the axle, which is requisite.

Obviously, my special form of resilient hub may be very expeditiously manufactured and the plurality of springs easily and quickly assembled when, with the proper degree of compression, the members forming my two-part hub are brought very tightly together in such a manner as to practically conceal their point of union, when by placing the retaining bands or collars 9 in place and turning the caps home on the ends of the hub, it is thought that no further attention will ever be required, inasmuch as each spring has a predetermined amount of work to perform—and being safely inclosed and properly treated with oil, the life or efficiency thereof will continue practically indefinitely. I wish therefore to call particular attention to the fact that I have provided a thoroughly reliable, desirable and efficient form of hub construction, whereby a great degree of resiliency is insured within the hub proper and the destructive blows incident to the use of a vehicle upon a roadway will be wholly absorbed and not communicated to the vehicle proper or the engine carried thereby, a most important and valuable desideratum.

Believing that the advantages, construction and manner of using my invention have been set forth, further description is deemed unnecessary.

What I claim as new is:

The combination, with an axle, of a two part hub having a bore, a boxing fitting loosely within said bore whereby an annular space is provided around the same, a plurality of cushioning springs operatively mounted in said annular space, caps secured over the ends of the hub to lock the parts together, the inner cap being apertured to loosely receive said axle and the wall of said aperture being grooved, and a flat ring formed of flexible material positioned within said groove to exclude dust from the interior of the hub.

In testimony whereof I have signed my name to this specification in the presence of two subscribing witnesses.

ADOLPH ROSEDALE.

Witnesses:
C. A. NEALE,
CHAS. P. SEIBOLD.